Nov. 17, 1925.

R. L. SMITH 1,561,750

SWIVEL

Filed Sept. 19, 1923

Robert L. Smith
INVENTOR

Patented Nov. 17, 1925.

1,561,750

UNITED STATES PATENT OFFICE.

ROBERT L. SMITH, OF HOUSTON, TEXAS.

SWIVEL.

Application filed September 19, 1923. Serial No. 663,623.

*To all whom it may concern:*

Be it known that I, ROBERT L. SMITH, a citizen of the United States of America, residing at Houston, in the county of Harris and State of Texas, have invented new and useful Improvements in Swivels, of which the following is a specification.

This invention relates to new and useful improvements in rotary swivels used in oil drilling and has for its primary object the construction of a swivel that when in operation will remain in true vertical alignment at all times.

An object of the invention is the novel manner of constructing and assembling the parts so that ready access may be had to any part should adjustment be required.

Another object of the invention is the provision of a device in which the parts are so connected that projections are eliminated to a considerable extent and besides a more substantial swivel is provided.

Besides the above my invention is distinguished in the fact that the parts so co-act that the thrust and strain are centralized and friction reduced to a minimum.

With these and other objects in view the invention will be better understood from the following detailed description taken in connection with the accompanying drawing wherein.

Figure 1:
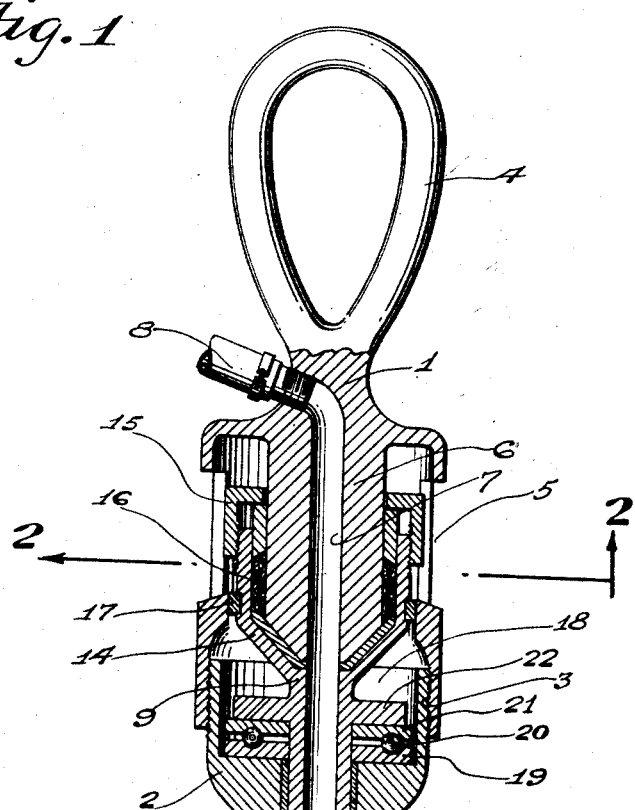
Fig. 1 is a vertical sectional view of my rotary swivel.
Figure 2:
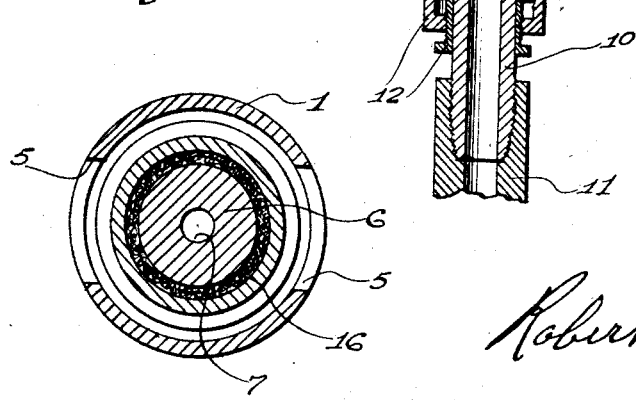
Fig. 2 is a sectional view on the line 2—2 of Fig. 1.

Again referring to the drawing illustrating one of the many constructions of my invention the numeral 1 designates an upper section and the numeral 2 a lower section which are detachably connected together by screw threads 3. The upper section 1 has extending vertically therefrom at a central point, an eye 4 for connection to the usual cable and is further provided with a series of openings 5 for the purpose hereinafter described. Centrally arranged within the upper section is the cylindrical projection 6 having a through passage 7 which communicates with the usual hose 8. The rotary section 9 is completely housed within the upper and lower sections and consists of a shank 10 rotatably mounted in the lower section and having screw threaded engagement with the drill stem 11 and further having a through passage. Gasket nuts 12 cooperate with packing elements 13 assuring liquid tight connection between the shank and lower section. This rotary section has its upper end portion formed into a hollow head 14 and gasket nuts 15 and packing elements 16 provide a liquid tight connection between the head and projection 6. A gasket ring 17 passes around the head and bears against the interior surface of the upper section so that the rotary section may be free to turn while at the same time prevent escapage of oil from the chamber 18.

For the purpose of reducing friction to the minimum I arrange in section 2 a bearing plate 19 upon which move the anti-friction elements 20. Bearing upon the elements 20 is a second bearing plate 21 engaged by the collar 22 formed solid with the shank 10.

From the foregoing description taken in connection with accompanying drawing it will be apparent that I provide a rotary swivel that is very substantial in its construction and in which the parts co-act in a manner to assure liquid tight joint while at the same time completely submerging the bearing elements in a bath of oil. It will also be noted the opening 5 allows ready access to the gasket nuts for quick adjustment should it be necessary.

It is, of course, to be understood that the various parts may be shaped and constructed in various other manners than illustrated, and therefore, I do not desire to be limited in any manner except as set forth in the claims hereunto appended.

Having thus described my invention what I claim is:

1. A rotary swivel comprising an upper hollow section, an eye projecting centrally therefrom, a cylindrical projection within the upper section having a through passage, a lower section screw threaded to the upper section, a rotary section having a shank rotatable in the lower section and projecting in same for engagement with the drill stem, a hollow head formed on one end of the rotary section encircling said projection, gasket means securing said head to said projection, a ring encircling the head and engaging against the interior surface of the upper section, a collar formed on said shank, an anti-friction means arranged between the collar and lower section.

2. A rotary swivel comprising an upper hollow section, an eye projecting centrally therefrom, a cylindrical projection within the upper section having a through passage, a lower section screw threaded to the upper section, a rotary section having a shank rotatable in the lower section and projecting in same for engagement with the drill stem, a hollow head formed on one end of the rotary section encircling said projection, gasket means securing said head to said projection, a ring encircling the head and engaging against the interior surface of the upper section, a collar formed on said shank, an anti-friction means arranged between the collar and lower section, said lower section being hollow and co-acting with said gasket ring to form an oil chamber around said bearing means.

3. A rotary swivel comprising an upper hollow section an eye projecting centrally therefrom, a cylindrical projection within the upper section having a through passage, a lower section screw threaded to the upper section, a rotary section having a shank rotatable in the lower section and projecting in same for engagement with the drill stem, a hollow head formed on one end of the rotary section encircling said projection, gasket means securing said head to said projection, a ring encircling the head and engaging against the interior surface of the upper section, a collar formed on said shank, an anti-friction means arranged between the collar and lower section, said lower section being hollow and co-acting with said gasket ring to form an oil chamber around said bearing means, said upper section being provided with a series of openings for allowing access to said gasket means.

In testimony whereof I affix my signature.

ROBERT L. SMITH.